(12) United States Patent
Turechek et al.

(10) Patent No.: US 10,859,105 B2
(45) Date of Patent: Dec. 8, 2020

(54) INSERT AND SYSTEM FOR PROVIDING A CALIBRATED METERING ORIFICE

(71) Applicants: David P. Turechek, Shelton, CT (US); Victor Kirilichin, Madison, CT (US); Brian P. Krieger, Albion, NY (US)

(72) Inventors: David P. Turechek, Shelton, CT (US); Victor Kirilichin, Madison, CT (US); Brian P. Krieger, Albion, NY (US)

(73) Assignee: Engineered Inserts & Systems, Inc., Watertown, CT (US)

( * ) Notice: Subject to any disclaimer, the term of this patent is extended or adjusted under 35 U.S.C. 154(b) by 0 days.

(21) Appl. No.: 16/182,117

(22) Filed: Nov. 6, 2018

(65) Prior Publication Data

US 2019/0136893 A1   May 9, 2019

Related U.S. Application Data

(60) Provisional application No. 62/582,579, filed on Nov. 7, 2017.

(51) Int. Cl.
*F16B 13/08* (2006.01)
*F16L 55/13* (2006.01)
(Continued)

(52) U.S. Cl.
CPC ...... *F16B 13/0858* (2013.01); *B25B 23/0064* (2013.01); *B25B 27/0014* (2013.01);
(Continued)

(58) Field of Classification Search
CPC ....... F16L 55/10; F16L 55/1108; F16L 55/13; F16L 55/132; F16L 55/11; F16L 13/147;
(Continued)

(56) References Cited

U.S. PATENT DOCUMENTS 2,821,323 A  1/1958 Lee, II
3,089,377 A  5/1963 Engstrom
(Continued)

FOREIGN PATENT DOCUMENTS

DE  102004003943 A1  8/2005
GB        142831 A   4/1921
(Continued)

*Primary Examiner* — Tyrone V Hall, Jr.
*Assistant Examiner* — Makena S Markman
(74) *Attorney, Agent, or Firm* — St. Onge Steward Johnston & Reens, LLC (57) ABSTRACT

An insert for connecting first and second parts each having holes, the insert having a cylindrical sleeve and a core. The cylindrical sleeve having a central void and an outer diameter sized to fit into the hole in the first part. The central void having a uniform diameter across a length of the cylindrical sleeve. The core having a through-hole and a tapered outer wall such that when the core is pulled into the cylindrical sleeve, the cylindrical sleeve expands against the hole of the first part to secure the insert to the first part. The through-hole of the core having a threaded portion at a first end of the core to engage with a threaded fastener to secure the second part to the first part. The first end of the core is press-fit into the cylindrical sleeve.

17 Claims, 10 Drawing Sheets

(51) Int. Cl.
  *F16B 13/06* (2006.01)
  *B25B 23/00* (2006.01)
  *B25B 27/04* (2006.01)
  *F16L 55/11* (2006.01)
  *F16B 37/06* (2006.01)
  *F16B 37/04* (2006.01)
  *B25B 27/00* (2006.01)

(52) U.S. Cl.
  CPC ............ *B25B 27/04* (2013.01); *F16B 13/066* (2013.01); *F16B 37/048* (2013.01); *F16L 55/1108* (2013.01); *F16L 55/13* (2013.01); *F16B 37/065* (2013.01)

(58) Field of Classification Search
  CPC .. F16L 37/04; B25B 27/0007; B25B 27/0028; B25B 27/14
  USPC .......................................................... 29/523
  See application file for complete search history.

(56) References Cited

U.S. PATENT DOCUMENTS

| | | | |
|---|---|---|---|
| 3,135,414 A | 6/1964 | Lee, II | |
| 3,175,455 A * | 3/1965 | Reddy | F16B 13/066 411/53 |
| 3,525,365 A | 8/1970 | Meulendyk et al. | |
| 3,674,055 A * | 7/1972 | Ray | F16L 55/132 138/89 |
| 3,941,028 A * | 3/1976 | Lobello | E21D 21/008 411/55 |
| 4,091,841 A * | 5/1978 | Beneker | F16L 55/13 138/89 |
| 4,325,665 A | 4/1982 | Jukes | |
| 4,390,042 A | 6/1983 | Kucherer et al. | |
| 4,421,137 A * | 12/1983 | Nusbaumer | F16L 55/13 138/89 |
| 4,787,420 A | 11/1988 | Wilhelm | |
| 4,865,080 A * | 9/1989 | Lundquist | B25B 27/0007 138/89 |
| 4,982,763 A * | 1/1991 | Klahn | F28F 11/02 138/89 |
| 5,094,809 A | 3/1992 | Lenoble et al. | |
| 5,160,226 A | 11/1992 | Lee, II | |
| 5,437,310 A | 8/1995 | Cunningham | |
| 5,984,369 A * | 11/1999 | Crook | F02K 9/343 285/21.1 |
| 6,942,439 B2 * | 9/2005 | Rouger | F16B 13/045 411/60.1 |
| 7,065,855 B2 * | 6/2006 | Janusz | B25B 31/00 29/256 |
| 8,961,086 B2 | 2/2015 | Pratt | |
| 9,249,916 B2 | 2/2016 | Jorgensen | |
| 9,316,245 B2 * | 4/2016 | Dvorak | F16B 37/0821 |
| 10,040,182 B2 * | 8/2018 | Kirilichin | F16L 55/1108 |
| 2015/0202754 A1 * | 7/2015 | Kirilichin | B25B 27/0014 29/523 |
| 2017/0058931 A1 | 3/2017 | Kirilichin et al. | |
| 2017/0232455 A1 * | 8/2017 | Grable | B05B 1/005 239/600 |
| 2017/0254453 A1 * | 9/2017 | Fremont | F16L 55/11 |
| 2019/0128301 A1 * | 5/2019 | Wojciechowski | F16B 2/185 |
| 2019/0195258 A1 * | 6/2019 | Zimmer | F16B 12/24 |

FOREIGN PATENT DOCUMENTS

| | | |
|---|---|---|
| WO | 2008045193 A1 | 4/2008 |
| WO | 2015112372 A1 | 7/2015 |

\* cited by examiner

INSERT AND SYSTEM FOR PROVIDING A CALIBRATED METERING ORIFICE

FIELD OF THE INVENTION

The following disclosure relates to an insert and a system, kit, and method for installing the same. More particularly, the insert may be designed to seal manifolds or other devices that may have holes therein, for example, a hydraulic manifold. In other aspects, the insert may be designed to provide an easy to install threaded hole to enable two parts to be attached together, which may be provided in alternative to or in addition to the sealing properties. The insert may be used to connect manifolds to other parts or the insert may be installed in parts other than manifolds to provide for threaded connection. The insert may also be used to install a calibrated metering orifice in a pressurized fluid manifold, such as a hydraulic or pneumatic manifold.

BACKGROUND OF THE INVENTION

There are various plug and sealing systems generally known. For example, some commercially available plugs include a rivet system having a stem that is designed to break off during installation of the plug in a hole. The stem acts similar to a pop rivet. The manufacturing of the stem can be a complicated and expensive process as the stem must break off at the appropriate force in order to properly install the plug. However, such a plug does not allow other parts to be attached to it after installation.

U.S. Pat. No. 4,584,755 to Lundquist discloses a tool and a plug for sealing a hole, for example, an unused coolant passage in an injection molding die. The plug includes a flexible, hollow cylindrical sleeve and a core member longitudinally interengageable into the sleeve. The core is of a generally cylindrical configuration. The sleeve is made of an elastomer material. The tool for installing the plug is activated by hand and does not appear to include any mechanical power. Further, the tool does not appear to have any depth control for controlling the installation depth of the insert.

U.S. Pat. No. 4,421,137 to Nusbaumer et al. discloses a plug assembly comprising a generally cylindrical expansion sleeve having a socket portion that receives a wedging nut. The head of a screw element engages with the sleeve on the side of the sleeve opposite the nut such that rotation of the screw pulls the nut into the sleeve. The threaded hole of the wedging nut extends all the way through the socket and the screw element remains in the hole after installation. There is no disclosure of the ability to use the insert to attach to other parts.

U.S. Pat. No. 8,381,934 to Brewer et al. discloses a sealing plug for blind installation. The plug includes a sleeve, a nut stem with a shoulder, and a head at least part of which is radially enlarged with respect to the stem. The nut stem is internally threaded such that when the nut stem is pulled axially, the shoulder presses against the sleeve and thereby expands the sleeve against a hole. There does not appear to be disclosure of the nut stem including a conical or tapered surface that presses against the sleeve. Further, the installation gun does not appear to include releasably secured and interchangeable end pieces.

Accordingly, it is desirable to provide an insert with easier installation and manufacturing. It is further desirable to provide an insert and sealing system that provides for repeatable installation of the plug in holes as well as to allow for connection to other parts and/or provide calibrated holes inside fluid pressurized systems.

SUMMARY OF THE INVENTION

Therefore, it is an object of the present invention to provide an insert that can be installed to provide a threaded hole in a part to enable connection to other parts.

It is another object to provide an insert without a stem.

It is yet another object of the present invention to provide an installation device that aids in the installation of the insert.

It is still another object of the present invention to provide a method for installing an insert using the installation device.

It is still another object of the present invention to provide a kit for installing a plurality of inserts in one or more holes.

It is still another object of the present invention to provide an insert that can withstand high pressures typically found in hydraulic manifolds and that can also be used to attach the manifold to other parts.

It is yet another object of the present invention to provide an insert having a calibrated metering orifice that can be installed in a pressurized fluid manifold.

It is yet another object of the present invention to provide the insert with the calibrated orifice and allow it to be installed in a blind manner such that the insert is installed below the outer surfaces of the manifold and cannot easily be seen after installation.

These and other objects are achieved by providing a system for connecting two parts using an insert. Each of the first and second parts has a hole. The hole of the first part is of a size configured to receive the insert, and the hole of the second part is of a size configured to receive a threaded member. The insert includes a cylindrical sleeve and a core that is press-fit into the cylindrical sleeve. The cylindrical sleeve includes a central void having a uniform diameter across a length of the cylindrical sleeve. The core includes a through-hole and a tapered outer wall, and the through-hole has a threaded portion. The cylindrical core has an outer diameter that fits into the hole of the first part such that when the core is pulled into the cylindrical sleeve, the cylindrical sleeve expands against the hole of the first part to secure the insert to the first part. The hole of the second part is sized such that the threaded member passes into but not all the way therethrough. The threaded member has threads sized to engage with the threaded portion of the through-hole of the core such that the threaded member and insert secure the first and second parts together.

In some embodiments, the through-hole of the core has a first diameter at a first end of the core and a second diameter at a second end of the core. The second diameter of the through-hole is smaller than, or equal to, the first diameter of the through-hole.

In some embodiments, the threaded portion of the through-hole of the core extends at least 50% of a depth of the through-hole. In other embodiments, the threaded portion of the through-hole of the core extends at least 75% of a depth of the through-hole. In yet other embodiments, the threaded portion of the through-hole of the core extends 100% of a depth of the through-hole.

In some embodiments, the insert also includes protrusions located on an outer surface of the cylindrical sleeve.

In some embodiments, the core has a height that is within 10% of a height of the cylindrical sleeve. In other embodiments, the core has a height that is within 5% of a height of the cylindrical sleeve.

In another embodiment of the present invention, an insert for connecting first and second parts each having holes is provided. The insert includes a cylindrical sleeve and a core. The cylindrical sleeve has a central void and an outer diameter sized to fit into the hole in the first part. The central void has a uniform diameter across a length of the cylindrical sleeve. The core has a through-hole and a tapered outer wall such that when the core is pulled into the cylindrical sleeve, the cylindrical sleeve expands against the hole of the first part to secure the insert to the first part. The through-hole of the core has a threaded portion at a first end of the core to engage with a threaded fastener to secure the second part to the first part. The first end of the core is press-fit into the cylindrical sleeve.

In some embodiments, the through-hole of the core has a first diameter at the first end of the core and a second diameter at a second end of the core. The second diameter of the through-hole is smaller than, or equal to, the first diameter of the through-hole.

In some embodiments, the insert also includes protrusions located on an outer surface of the cylindrical sleeve.

In some embodiments, the core has a height that is within 5% of a height of the cylindrical sleeve.

In yet another embodiment of the present invention, a method of installing an insert is provided. The method includes the steps of: providing an insert with a core and a cylindrical sleeve having a central bore, the central bore having a uniform diameter across a length of the cylindrical sleeve, the core having a through-hole having a threaded portion, the core is press-fit into the cylindrical sleeve; coupling a threaded rod to the threaded portion of the through-hole of the core; inserting the insert into an installation hole of a first part; pulling the core into the cylindrical sleeve to radially expand the cylindrical sleeve against a surface of the installation hole; and removing the threaded rod from the threaded portion of the through-hole.

In some embodiments, the method also includes the steps of: providing a second part having a hole; and connecting the second part to the insert via the threaded portion of the through-hole of the core.

In some embodiments, the threaded portion of the through-hole has a first diameter and a second portion of the through-hole has a second diameter smaller than the first diameter.

In some embodiments, the insert is positioned at a distance below an outer surface of the first part that is adjacent the installation hole. The distance is long enough such that an intersecting passageway transverse the first hole is between the insert and the outer surface.

In an alternative embodiment of the present invention, an insert for providing a calibrated metering orifice in a pressurized fluid manifold having a hole is provided. The insert includes a cylindrical sleeve and a core. The core has a through-hole and a tapered outer wall. The through-hole has a threaded portion with a first diameter and a second portion having a diameter smaller than the first diameter. The cylindrical sleeve is configured to fit into the hole in the manifold such that when the core is pulled into the cylindrical sleeve, the cylindrical sleeve expands against the hole of the manifold to secure the insert to the manifold.

In some embodiments, the second portion of the through-hole is provided without threads.

In some embodiments, when the insert is configured to be installed in the manifold, a top surface of the insert adjacent the threaded portion of the through-hole is below an outer surface of the manifold.

In some embodiments, when the insert is configured to be installed in the manifold, a top surface of the insert adjacent the threaded portion of the through-hole is a distance below an outer surface of the manifold adjacent the holes. The distance is long enough such that an intersecting passageway transverse the hole is between the insert and the outer surface.

DETAILED DESCRIPTION OF THE INVENTION

Referring now to the drawing figures, wherein like reference numerals designate corresponding structures throughout the views. The following examples are presented to further illustrate and explain the present invention and should not be taken as limiting in any regard.

In FIGS. 1A-D, the insert 1 has two sections. As shown, core 3 has a tapered wall 2 and an upper cylindrical section 7. In some embodiments, the tapered section will extend from the top of the core towards the bottom. In some embodiments, a rounded section is disposed at the top of the core and the taper extends at the end of the rounded section. Cylindrical sleeve 5 has an outer surface which may include protruding ridges or rings 6. The ridges 6 may interact with an installation hole to better secure or seal the insert to the hole. Although ridges are shown, it is understood that other textures can be used on the outside of the insert. In the illustrated embodiment, the series of rings provide both additional resistance and friction against the inside of the installation hole. The rings can further act as flow stops that can help to prevent leakage through the installation hole when the insert is installed in the installation hole as fluid would need to pass beyond each of the ridges. Therefore, inconsistencies and surface irregularities in the hole can be taken into account by the ridges. The rings may further provide added resistance to blow out.

Figure 1A:
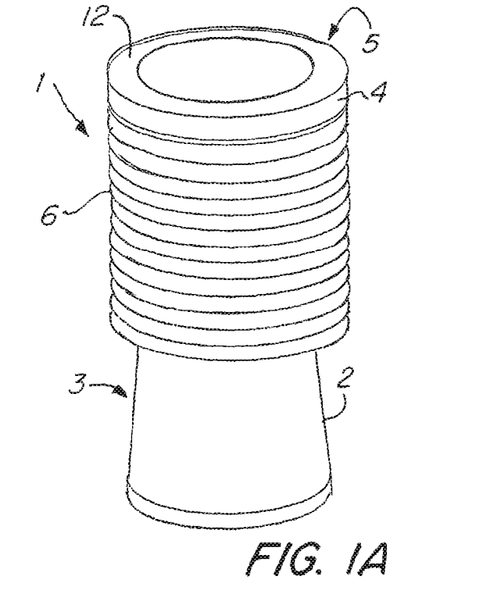
FIG. 1A is a perspective view of an insert according to a first embodiment of the present invention.
Figure 1B:
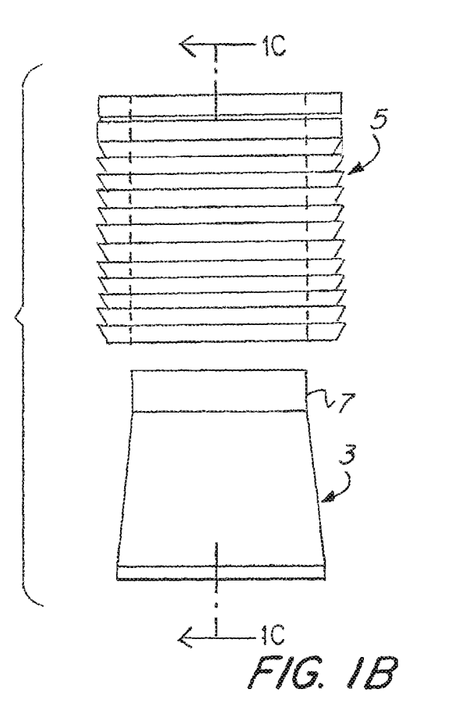
FIG. 1B is an exploded view of the insert of FIG. 1A.
Figure 1C:
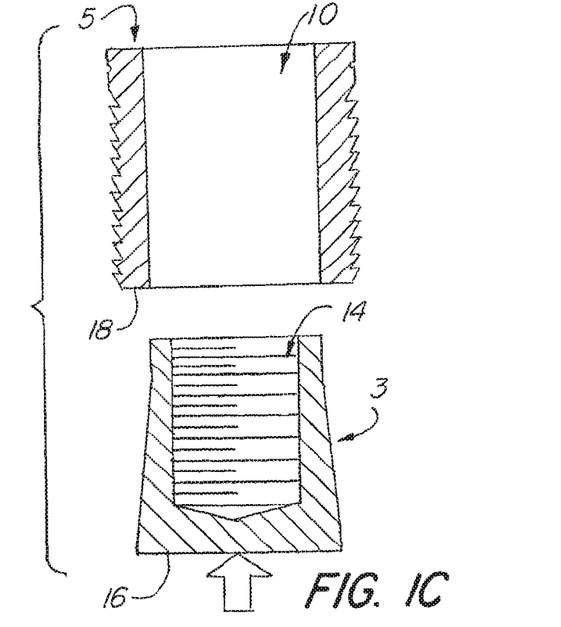
FIG. 1C is an exploded sectional view along section line 1c-1c of the insert of FIG. 1A.
Figure 1D:
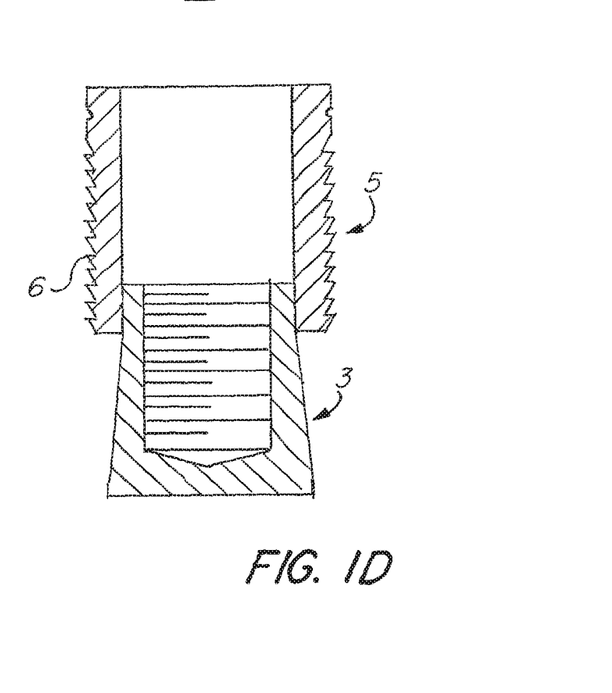
FIG. 1D is a side sectional view along section line 1c-1c of the insert of FIG. 1A.

Cylindrical sleeve 5 has a top surface 12 and has a void 10 passing through the cylindrical sleeve 5. Core 3 inserts into the void 10 at one end. In the illustrated embodiment of FIGS. 1A-1D, cylindrical section 7 of the core 3 is press fit into the lower end of sleeve 5. The tolerances between the diameter of the void 10 and the diameter of the cylindrical section 7 allow the cylindrical sleeve 5 to retain the core 3 to create an assembled insert as shown in FIGS. 1A and 1D. In some embodiments, the core 3 has a height that is less than or equal to 20% of the height of the cylindrical sleeve 5. In some embodiments, the core 3 has a height that is less than or equal to 15% of the height of the cylindrical sleeve 5. In some embodiments, the core 3 has a height that is less than or equal to 12.5% of the height of the cylindrical sleeve 5. In some embodiments, the core 3 has a height that is less than or equal to 10% of the height of the cylindrical sleeve 5. In some embodiments, the core 3 has a height that is less than or equal to 7.5% of the height of the cylindrical sleeve 5. In preferred embodiments, the core 3 has a height that is less than or equal to 5% of the height of the cylindrical sleeve 5.

The core 3 has a hole 14 that can releasably secure to an installation device. As shown in FIGS. 1C and 1D, the hole 14 is threaded in order to provide the releasable securing. It is also contemplated that the hole 14 can include various structures that provide for releasable securing of the plug. For example, the hole may have a groove cut out there from that can interact with a catch that can extend or retract from the installation device. As one example, the hole 14 may include a first section with a first diameter and a second section with a second diameter disposed below the first section of the hole 14. A catch can interact with the second section or the downward facing surface defined between the first and second sections.

Figure 12:
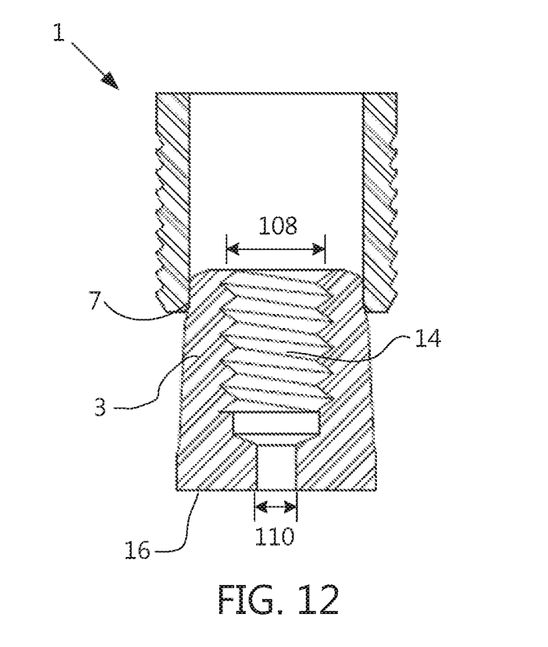
FIG. 12 is a side sectional view of an insert according to a third embodiment of the present invention.
Figure 13:
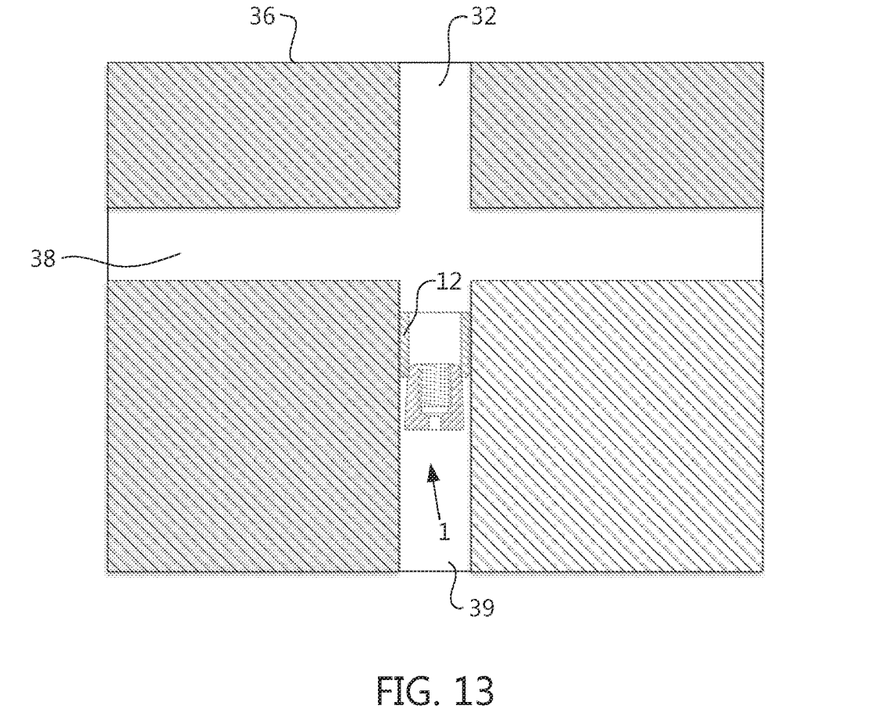
FIG. 13 is a side sectional view of a manifold having the insert of FIG. 12 installed within a passageway of the manifold.

In preferred embodiments, the hole 14 extends all the way through the core 3, as shown in FIGS. 10-13. In some embodiments, the threaded portion of the through-hole 14 extends at least 50% of the depth of the through-hole 14. In some embodiments, the threaded portion of the through-hole 14 extends at least 75% of the depth of the through-hole 14. In some embodiments, the threaded portion of the through-hole 14 extends 100% of the depth of the through-hole 14. In some embodiments, a bottom portion of the through-hole 14 is not threaded and has a diameter 110 at the bottom end 16 of the core 3 that is smaller than the diameter 108 of the through-hole 14 at the top end 7 of the core 3, as shown in FIG. 12. The embodiment shown in FIG. 12 can be used when it is desired to install a calibrated metering orifice within an active passageway of a pressurized fluid manifold, such as a hydraulic or pneumatic manifold. As depicted in FIG. 13, the insert 1 is installed in passageway 39 via installation hole 32. The insert 1 is installed at a depth such that a passageway 38 that is transverse to passageway 39 and installation hole 32 is between the top end 12 of the insert 1 and the outer surface 36 adjacent the installation hole 32. The installation hole 32 can then be plugged. The change in diameter across the through-hole 14 of the insert 1 meters, or alters, the pressure of the fluid flowing between passageways 38/39.

Figure 14:
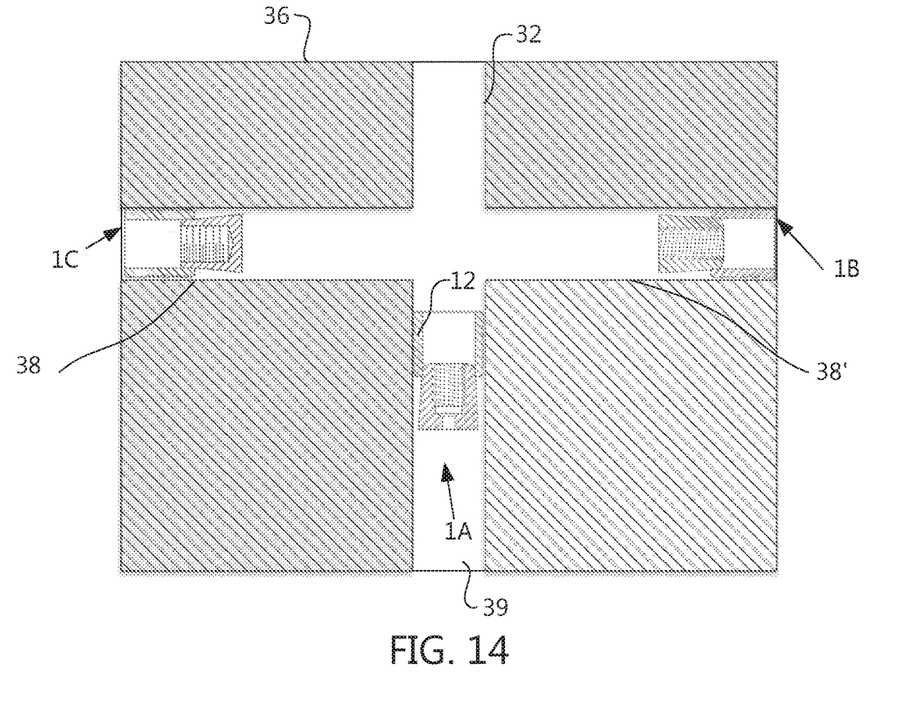
FIG. 14 is another side sectional view of a manifold having the inserts of FIG. 11 and FIG. 2A-D installed in a passageway of the manifold.

FIG. 14 shows three of the inserts 1A, 1B, 1C to be installed in the various passageways. As shown, the inserts are in the un-retracted position (prior to the core being pulled into the sleeve) but would be retracted and installed in the manner shown in FIGS. 2A-D. In FIG. 14 insert 1C operates to plug and seal the left side of passageway 38. Insert 1A is provided below passageway 38/38' in order to provide the calibrated leak hole which acts to reduce the pressure in passageway 38/38' and 32 as compared to passageway 39 which may have at or close to the pressure created by the hydraulic pump. Insert 1C would be installed using the elongated end piece shown in FIG. 7B to allow for blind installation below the top surface of the insert. The length of extension 502 would be appropriately calibrated to allow for such installation depth. Typically, the passageway 32 would be threaded to allow for hydraulic lines to connect thereto. Passageway 38' may have been originally a smaller inner diameter than shown with the maximum diameter of the threads being at or less than the diameter shown. In this case, insert 1B would typically be provided as a repairing insert in that if the threads originally at passageway 38' became stripped, the hole could be drilled out to the larger diameter appropriate for insert 1B and the threaded through-hole would be provided to secure a hydraulic line. As the through-hole may operate to reduce pressure in some cases it is also contemplated that the insert 1B may be of a larger diameter (with the passageway 38' also larger) so that the repaired threaded hole size is the same as the original hydraulic fitting. This would allow the stripped threads in the manifold to be repaired and in some cases repaired in the field rather than requiring a full replacement manifold.

It is also understood that insert 1A can be installed above passageway 38/38' and in passageways 32. This would cause the hydraulic line/supply line leading out of passageway 32 to be of a lower pressure as compared to passageway 38' (which in many cases would not have an insert and would have the passageway 38' tapped to receive a hydraulic line/supply line). The upper end of passageway 32 adjacent the outer surface 36 may be threaded to allow for securing to other parts in the hydraulic/fluid system. The insert 1A would be installed at a depth/distance below outer surface 36 such that the top of the sleeve of the insert 1A is positioned below the end of the threads provided in passageway 32. In the example with the insert 1A installed above passageway 38/38' the supply pressure coming from passageway 39 would be transferred to passageway 38' and the line connected thereto whereas the pressure would be reduced by the calibrated hole/leak in insert 1A which is installed in passageway 32 above passageway 38/38' (not shown). A variety of placements and arrangements of inserts within various holes within the manifold are contemplated depending on the design characteristics of the manifold and the corresponding hydraulic system. It is further contemplated that the insert 1A (of FIG. 12) can be installed in a passageway and also that the threaded hole therein can be used to connect to a hydraulic line/supply line. It is understood that the inserts also can be utilized in other fluid systems, e.g. air pressure and others and that the invention and disclosure is not limited to hydraulic manifolds and systems.

In some embodiments, hydraulic lines may be installed in an insert having a hole extending all the way through the core. In some cases, the threads used to install hydraulic or other lines may become damaged. Rather than replacing the entire manifold, the threaded hole of the manifold can be bored out and an insert can be inserted inside the bored out hole. When the threads pass all the way through the core 3, the insert can be used to repair threads for hydraulic lines. In other embodiments, the bottom 16 of core 3 is solid and the hole 14 does not pass all the way through the core 3 and that insert can be used to connect to other parts.

Proximate to bottom section 18, a lip may be located within cylindrical sleeve 5. Further, core 3 may include a corresponding lip close to the top of the tapered section or cylindrical section 7. These two lips can interact to prevent or resist the possibility that core 3 can be extracted from cylindrical sleeve 5.

Figure 2A:
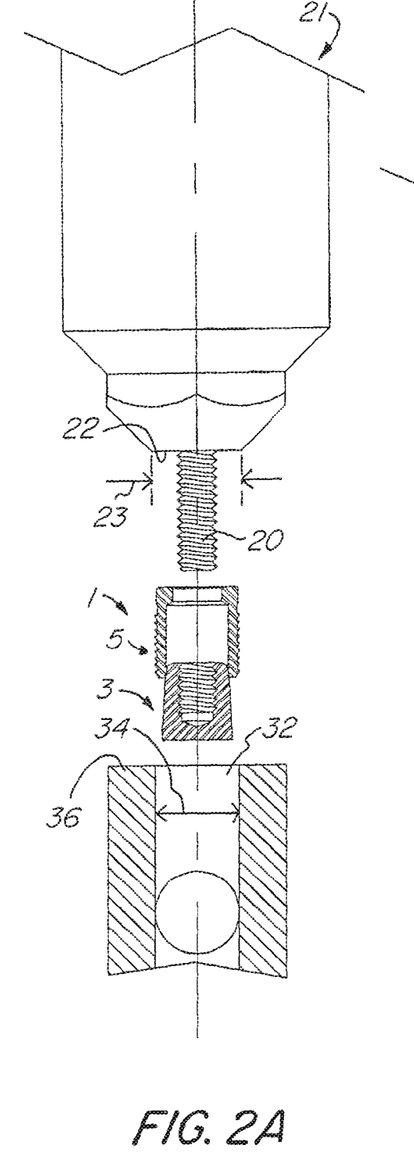
FIGS. 2A-2D are exemplary views of an insert similar to FIG. 1A being installed in a hole.
Figure 2B:
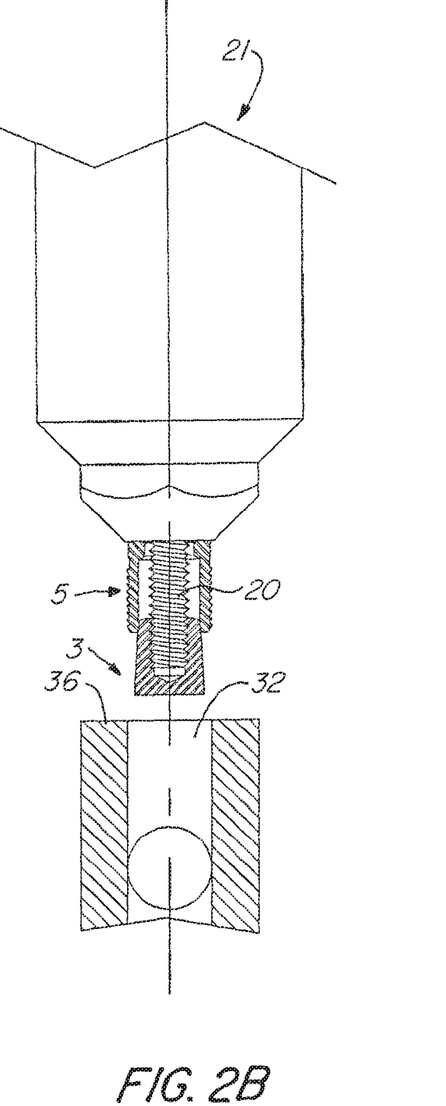
Figure 2C:
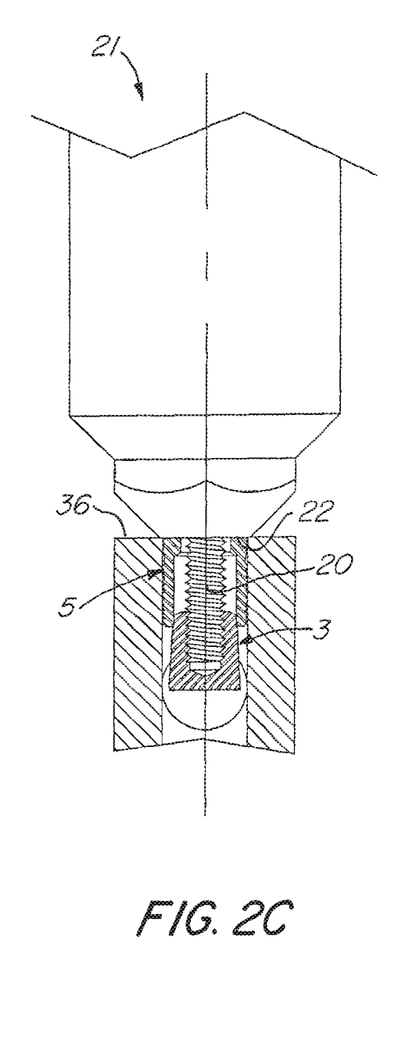
Figure 2D:
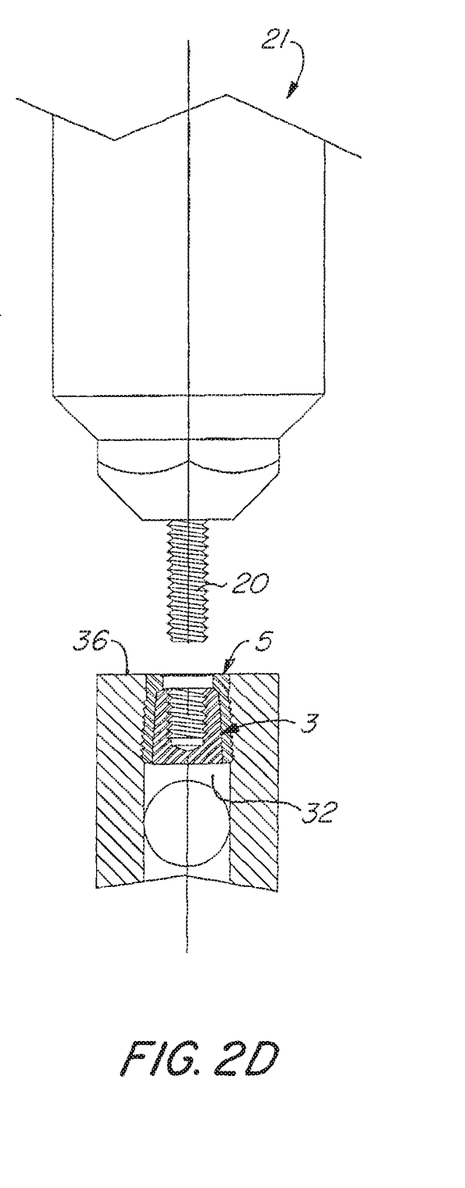

In FIGS. 2A-2D the insert 1 is shown being installed in installation hole 32. A pull-rod 20 is inserted into the insert to engage the threaded hole 14. In some embodiments, pressure on the pull-rod 20 activates a switch to cause rotation of the pull-rod 20, thereby threading the pull-rod 20 into the insert 1. In FIG. 2B, the insert is shown threaded onto the pull-rod 20. The top surface of the insert sleeve 5 is in contact with distal surface 22 of the installation device. The diameter of the hole 34 is smaller than the diameter or size 23 of the distal surface. As shown in FIG. 2C, when the insert is inserted into the hole 32, part of the distal surface 22 rests on the surface 36 that is adjacent to hole 32, thereby controlling the installation depth of the insert. From FIGS. 2C to 2D, pull-rod 20 is retracted into the installation device thereby radially expanding the insert against the wall of the hole. The pull-rod then extends and rotates out of the insert, leaving the insert installed in the hole 32. It is also contemplated that the inserts shown in FIGS. 11 and 12 can be installed in a similar manner as shown in FIGS. 2C to 2D.

In some embodiments, the core and sleeve of the insert are made of a metallic material, in some cases a steel or aluminum alloy can be used. In some embodiments, the insert can be design to resist blow out for pressures of 40,000 psi. The insert shown in FIGS. 2A-2D is shown in more detail in FIG. 8. As shown, top lip 11 provides an additional sealing function where the top surface of the core presses against lip 11 to provide additional leakage resistance.

The core and cylinder are sized so that the core can be press-fit into the cylinder. The taper angle of the core is designed to provide sufficient radial expansion without being so large as to progressively force the core out of the cylinder. Too large of an angle could result on too high of a resultant downward force between the cylinder and core which could force the core out of the cylinder over time. Therefore, the taper angle may be as large as 10°. Preferably, the angle is in the range of 5°-6°. The outer dimension of the sleeve and the inner dimension of the hole are typically also within close tolerances so that the radial expansion of the sleeve is sufficient to seal the hole. For example, the outer diameter of the sleeve may be 0" to 0.004" smaller than the diameter of the hole (diameter difference). It is understood that larger differences in diameter between the sleeve and the hole could still seal the hole, but may result in a lower blow out pressure. In addition, the ridges or ribs that protrude from the sleeve can provide additional guards for sealing the hole. It is understood that the ribs may be created by removal of material from the sleeve in channels to create the ribs or ridges that are raised with respect to the channel. These ribs or ridges can account for 0-20% of the outer diameter of the sleeve and more preferably 15-20% of the outer diameter of the sleeve. In some cases, the ridges can protrude 0.004-0.008" and preferably 0.006". Therefore, the ratio of ridge protrusion to diameter difference may be approximately 1:1-1:2 and preferably 1:1.5. The cylinder and core are typically made of relatively hard materials, for example steels. In some embodiments, the hardness may be measured as Re20 on the Rockwell hardness scale. In some embodiments, the hardness of the rings or ridges may be increased so that the ridges are forced into the surface of the installation hole, thus providing added sealing and resistance to leakage. It is understood that the specific dimensional characteristics described herein are exemplary only and not limiting in scope.

Figure 3:
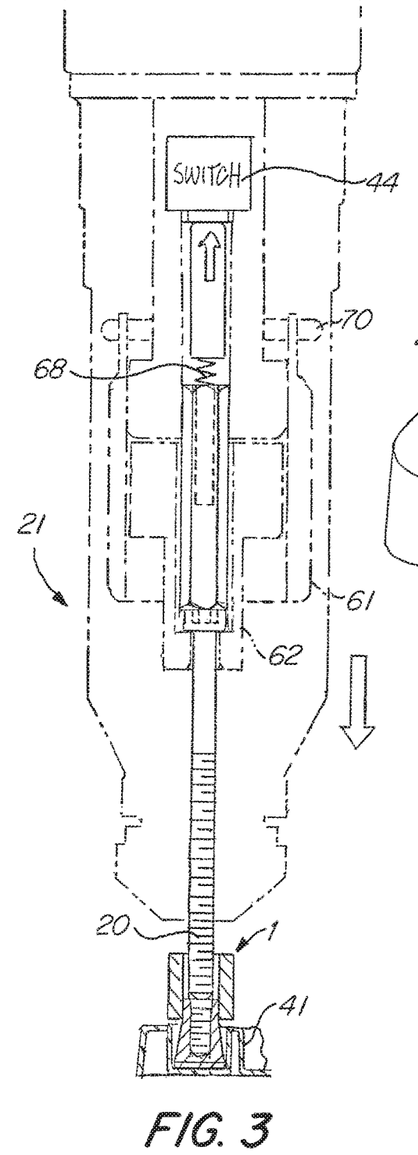
FIG. 3 is a sectional view of the insert of FIG. 1A being threaded onto an installation machine.

In FIG. 3, the installation device is shown with the pull-rod 20 placed against the insert 1. The insert 1 is located in a tray 40. Upon exerting pressure against the insert, pull-rod 20 retracts slightly to activate switch 44. Upon activation of the switch, pull-rod 20 rotates to thread the insert onto the pull-rod. Once the insert is threaded onto the rod, the insert can be installed in the hole as shown in FIGS. 2A-2D.

Figure 4A:
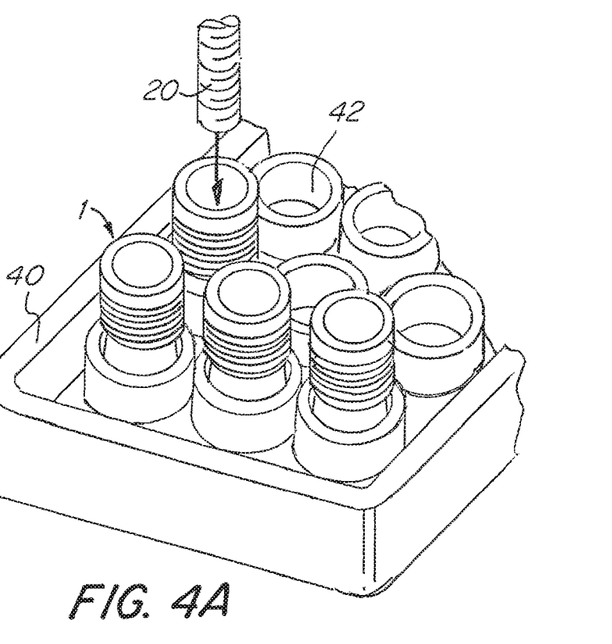
FIG. 4A is a perspective view of a tray holding multiple inserts of FIG. 1A.
Figure 4B:
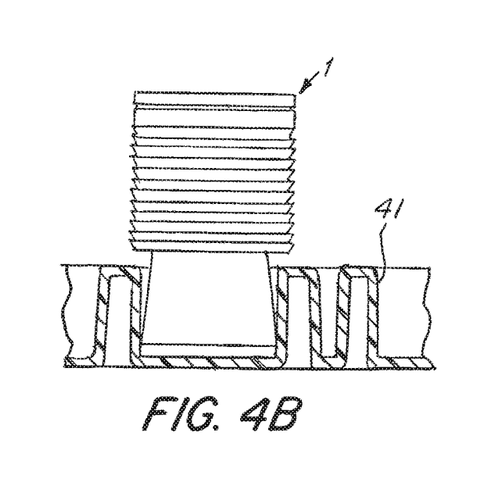
FIG. 4B is a side partial cutaway view of the tray of FIG. 4A.

It is understood that the installation device can also be a robotic or other mechanical arm that is computer or electronically controlled. For example, on an assembly line. In FIGS. 4A-4B, a tray 40 has holes 42 disposed in a known pattern so that the installation device can pick up an insert by threading the pull-rod into the core. Therefore, the tray can come with a plurality of inserts pre-installed therein. Additionally, one or more reference marks can be found on the insert tray to calibrate the location of the inserts. The inserts are pressed into the holes 42 so that part of the wall 41 contacts the insert. As shown in FIG. 4B, the wall contacts the bottom section of the core. It is understood that the tray can be designed to contact the sleeve or both the sleeve and core. In some embodiments, the torque exerted on the insert when the pull-rod 20 is threaded into the insert is less than the force exerted on the insert by contact with the tray 40. This force allows the pull-rod 20 to rotate without causing the insert to rotate within the hole 42. Thus, allowing the insert to be connected to the pull-rod 20 without a human holding the insert. The tray further allows robotic installation systems to easily pick up inserts on assembly lines.

Figure 5:
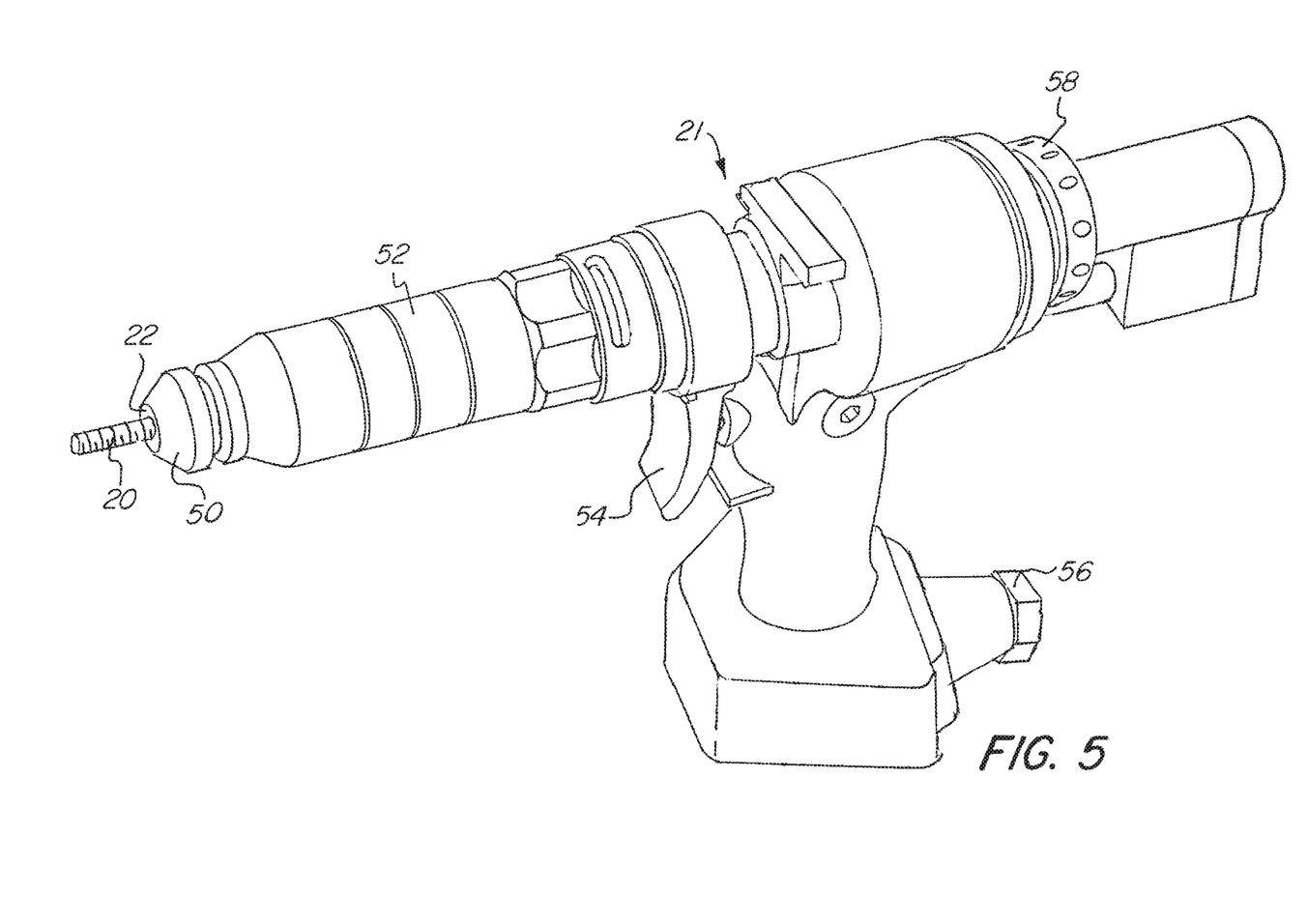
FIG. 5 is a perspective view of the installation machine used to install the insert of FIG. 1A.

In FIG. 5, an example of a hand-held installation device is shown. End piece 50 can be rotated to adjust the amount of the pull-rod extending from the end of the installation device 21. Casing 52 is shown, and the pull-rod retracts and rotates within this casing. Trigger 54 can be depressed to activate a retraction mechanism to pull the pull-rod into the casing to pull the core into the sleeve. Adjustment wheel 58 can be rotated to adjust the length of the pull stroke. The installation device 21 as shown is pneumatically activated. Connection 56 receives pneumatic supply lines that feed pressurized air to the installation device 21.

Figure 6:
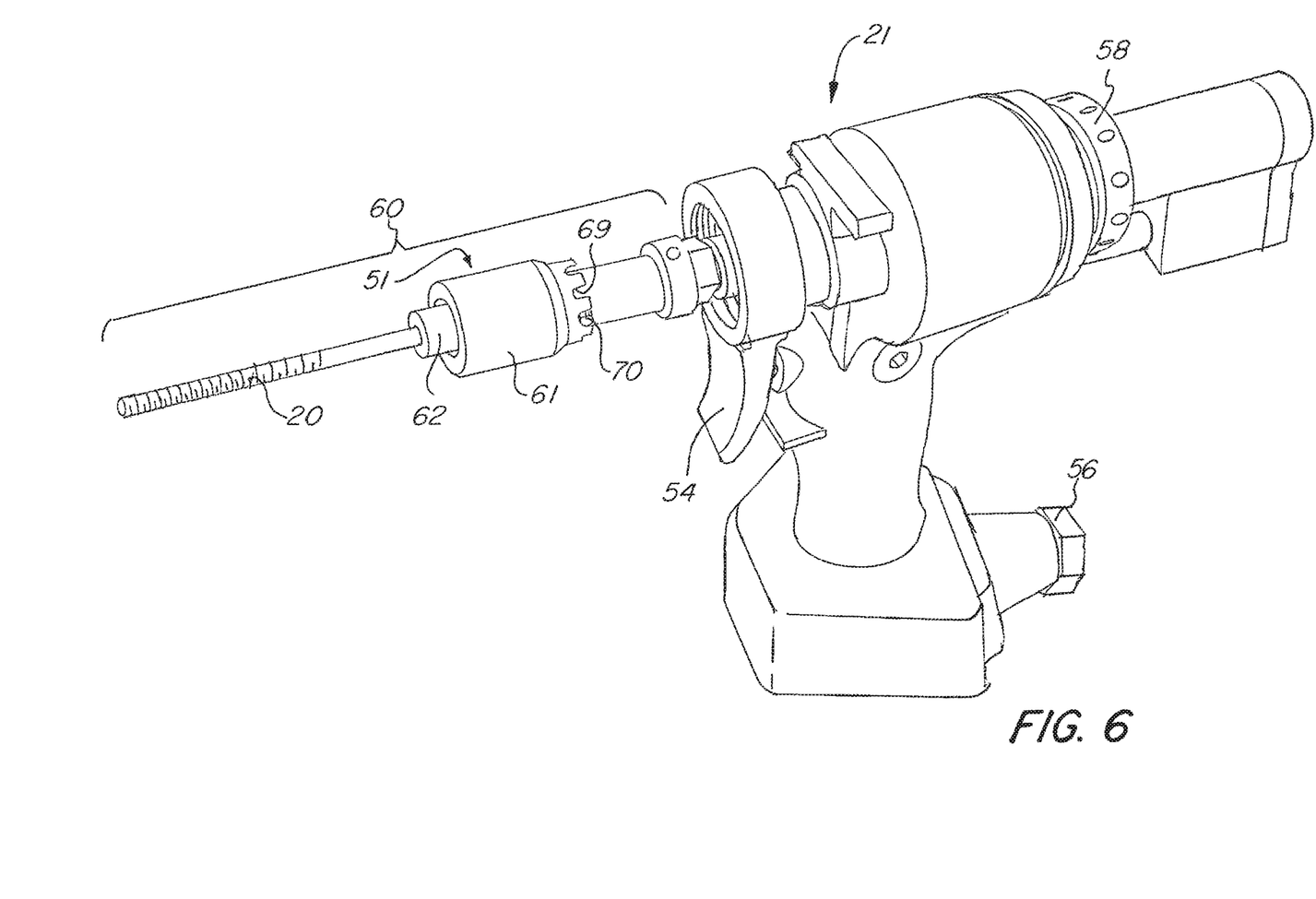
FIG. 6 is a perspective view of a partially dis-assembled installation machine used to install the insert of FIG. 1A.

In FIG. 6, the casing 52 is removed and the internal couplings 60 of the installation device are shown. Pull-rod 20 as shown is a threaded member with a threaded portion. The pull-rod is held by a first coupler 62 which is secured to the gun by a second coupler 61. Interlocking rod 70 and recess 69 prevent the second coupler 61 from rotating. The interlocking rod 70 can be spring loaded and retractable along the axis of the pull-rod so that the interlocking rod 70 can be retracted to allow the second coupler 61 to be rotated.

Figure 7A:
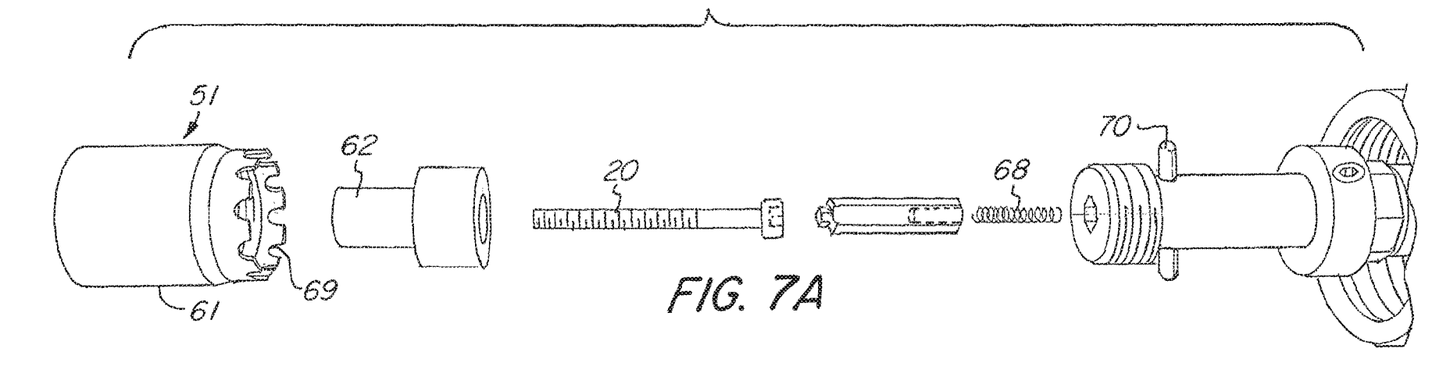
FIG. 7A is a side exploded view of the installation machine used to install the insert of FIG. 1A.

In FIG. 7A, pull rod 20 includes a head with a hex recess 66. Hex protrusion 65 extends from a rotation coupler 64. The rotation coupler is inserted into hex hole 67 and spring 68 allows for the rotation coupler 64 to move back and forth. When pressed into the hole 67, coupler 64 activates switch 44 shown in FIG. 3 to cause rotation of the pull-rod. First coupler 62 has the pull-rod inserted therein, and the head of the threaded member interacts with an internal surface of the first coupler 62 to provide an insertion stop. The insertion stop likewise exerts pressure on the underside of the head when coupling assembly 60 is retracted to radially expand the metallic sleeve of the insert. Second coupler 61 also includes a stop 75, recesses 69 and threads 73. The stop of the second coupler exerts pressure on the underside of the first coupler 62 when the coupling assembly is retracted. The female threads 73 interlock with male threads 71 of the retracting member 74. As previously discussed, rod 70 and recess 69 interact to secure the second coupler to the retracting member 74 to complete the coupling assembly 60. Sleeve 52 is hollow and extends over the coupling assembly 60 with threads 24 securing to threads 72. FIG. 7C shows the casing 52, which is installed over the assembly of FIG. 7A.

Figure 7B:
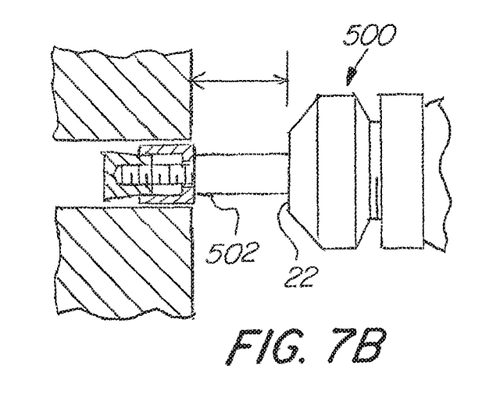
FIG. 7B is an alternate embodiment of the end piece of the machine used to install the insert of FIG. 1A.
Figure 7C:
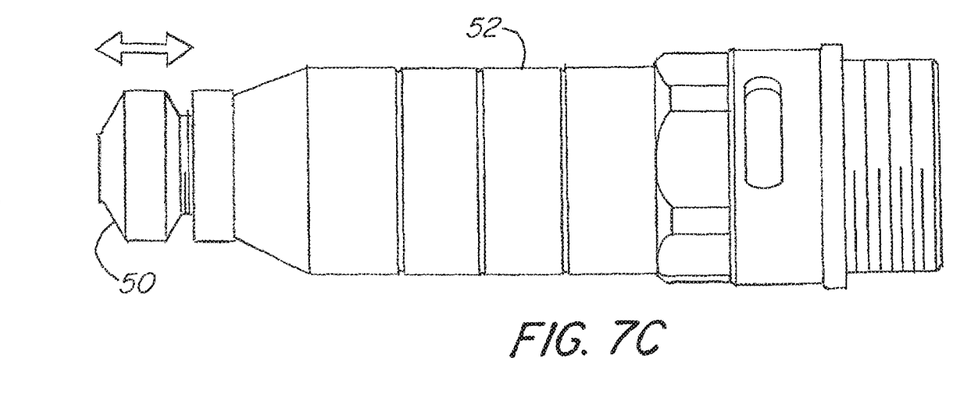
FIG. 7C is a side view of the casing that covers the assembly of FIG. 7A.

In FIG. 7B, an alternate end piece 500 is shown with a distal extension 502 extending from the end piece 500. This distal extension has a diameter smaller than the size of the installation hole, but large enough so that the distal surface of the distal extension 502 contacts top surface 12 of the insert. The length of the distal extension 502 controls the installation depth of the insert as distal surface 22 of the alternate end piece 500 contacts the outer surface 36 of the installation hole.

Figure 8:
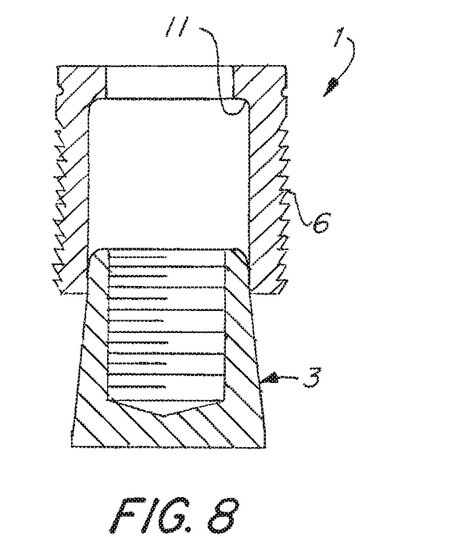
FIG. 8 shows an alternate embodiment of the insert of FIG. 1A.
Figure 9:
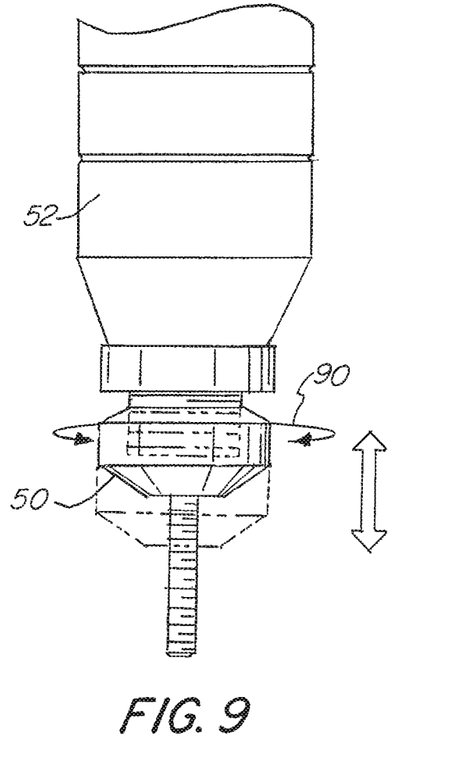
FIG. 9 shows how the position of the end piece of the machine used to install the insert of FIG. 1A can be adjusted.

In FIG. 8, an alternate embodiment of an insert is shown with a curved section 11 that mates with a corresponding curved section of the core when the core is pulled into the cylinder during installation. In FIG. 9, adjustment of the end piece 50 is shown. Rotation of the end piece 90 causes the end piece to extend or retract, thus adjusting how much of the pull-rod 20 extends past the distal surface 22.

Sealing is obtained by the expansion of the insert against the hole which may be in a manifold. Further, the depth the tapered section is pulled into the cylindrical section may be predetermined and repeatable regardless of hole size based on a pull setting of the installation device. The depth of pull can also be controlled by a force sensor or a control system. For example, upon reaching a certain pull force, the installation device may stop pulling on the insert and proceed to release the insert from the end piece. The pre-determined pull force may be set based on hole size, insert size, or other criteria related to the installation of the plug in the hole. When installed, the insert withstands high pressures commonly found in hydraulic manifolds and systems. For example, some embodiments of the inserts shown and described herein can withstand pressures up to and in excess of 40,000 PSI.

Figure 10:
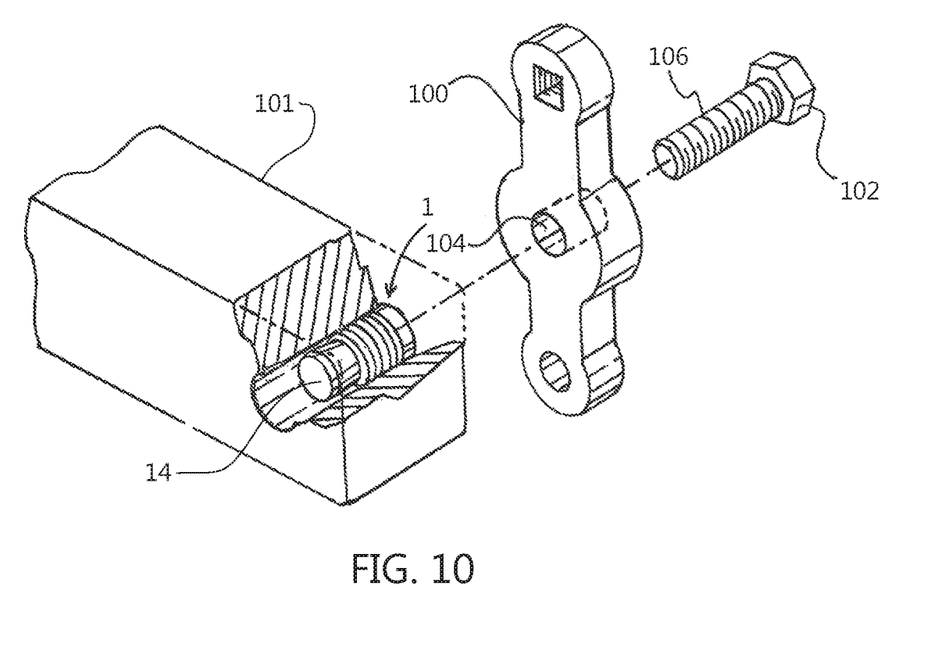
FIG. 10 shows an exploded view of the insert used to secure two parts together.
Figure 11:
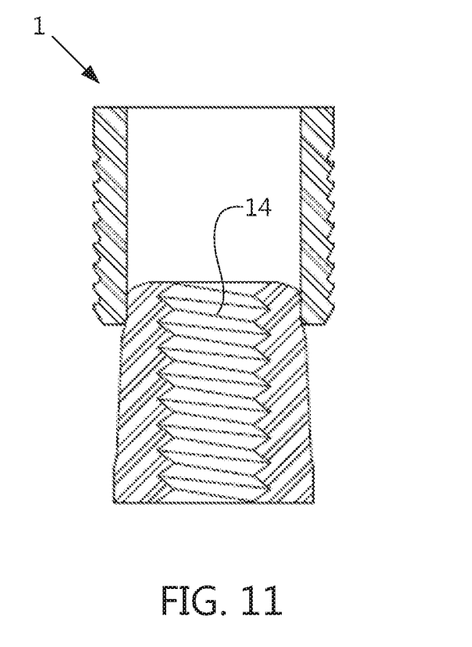
FIG. 11 is a side sectional view of an insert according to a second embodiment of the present invention.

Referring to FIG. 10, two parts 100/101 can be connected together using the insert. The hole where the insert is installed in may be sealed by the insert or in other aspect, the sealing characteristics of the insert may be considered secondary. The insert 1 is installed in a hole as in previous figures. This hole may be in a manifold or may be in another part of any suitable material including metals, plastics, ceramics, composites and others. The hole may also be only partially into the part 101, i.e. not a through-hole. It is also understood that the part 101 may be the manifolds shown in previous figures or other parts that include a hole sized to receive the insert 1. Preferably, the hole in the first part 101 has a depth that is greater than 1.5 times the length of the core 3 of the insert 1.

The insert 1 as shown in FIG. 10 is in the un-expanded position. It is understood that the insert may be installed using the installation gun such that the core is pulled up into the sleeve to secure the insert within the hole of part 101. FIG. 2D provides an example of such insert fully installed. A threaded member 102 can then be inserted through a hole 104 of a second part 100 and threaded into the hole 14 of the insert 1 to secure parts 100/101 together. It is also understood that in certain embodiments, the threaded hole 14 of the insert 1 may extend all the way through the core 3 such that it is a threaded through-hole. In such a situation, the threaded member 102 may be threaded into the hole 14 of the core 3 and the insert 1 in the unexpanded position shown may be placed within the part 100 between the threaded member 102 and the part 101. The threaded member 102 may then be tightened such that threads 106 pull the core up into the sleeve and the sleeve presses against the part 100. In either case, the insert 1 provides for a threaded hole in the block 101. Such an insert may be particularly useful when existing threading has been damaged. Here, a new hole would drill out the old and damaged threads and the plug would be placed in the new hole to provide for replacement threads.

Part 100 is shown as an exemplary part for the purposes of showing that it can be connected via insert 1. Part 100 can take many other forms as would be apparent to those of skill in the art. Hole 104 is provided to receive the threaded member 102 such that threads 106 and 14 can interact to hold the parts 100/101 together. It is also understood that the threaded member may be a hydraulic or fluid pressure fitting and corresponding tube/line.

Although generally round inserts have been shown, it is understood that the geometry of the insert can change in order to interact with the hole to be sealed or connected to. It is further understood that various types of drives may be employed with the installation device, for example hydraulic or electric motor drives can be employed.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system providing for connection between two parts comprising:
    first and second parts each;
    the hole of the first part of a size configured to receive an insert therein;
    the insert including a cylindrical sleeve and a core press-fit into the cylindrical sleeve, the core having a through-hole and a tapered outer wall which is smooth, the through-hole of the core having a threaded portion with a first diameter and a second portion having a diameter smaller than the first diameter; and
    an outer diameter of the cylindrical sleeve fitting into the hole of the first part wherein when the core is pulled axially into the cylindrical sleeve such that the tapered outer wall slides axially within the cylindrical sleeve, the cylindrical sleeve expands against the hole of the first part to secure the insert to the first part;
    wherein the hole of the second part is configured to be attached to the insert with threads sized to engage with the threaded portion of the through-hole of the core such that insert secure the first and second parts together.

2. The system of claim 1, wherein the threaded portion of the throughhole of the core extends at least 50% of a depth of the through-hole.

3. The system of claim 1, wherein the threaded portion of the throughhole of the core extends at least 75% of a depth of the through-hole.

4. The system of claim 1, wherein the threaded portion of the throughhole of the core extends 100% of a depth of the through-hole.

5. The system of claim 1, further comprising protrusions located on an outer surface of the cylindrical sleeve.

6. The system of claim 1, wherein the core has a height that is within 10% of a height of the cylindrical sleeve.

7. The system of claim 1, wherein the core has a height that is within 5% of a height of the cylindrical sleeve.

8. An insert for connecting first and second parts each having holes comprising:
   a cylindrical sleeve having a central void and an outer diameter sized to fit into the hole in the first part, the central void having a uniform diameter across a length of the cylindrical sleeve; and
   a core having a through-hole and a tapered outer wall which is smooth, the through-hole having a threaded portion with a first diameter and a second portion having a diameter smaller than the first diameter wherein when the core is pulled axially into the cylindrical sleeve such that the tapered outer wall slides axially within the cylindrical sleeve, the cylindrical sleeve expands against the hole of the first part to secure the insert to the first part;
   the threaded portion is at a first end of the core and engages with the threads to secure the second part to the first part.

9. The insert of claim 8, further comprising protrusions located on an outer surface of the cylindrical sleeve.

10. The insert of claim 8, wherein the core has a height that is within 5% of a height of the cylindrical sleeve.

11. A method of installing an insert to provide a calibrated metering orifice comprising the steps of:
   providing an insert with a core and a cylindrical sleeve having a through-hole and a tapered outer wall which is smooth, the through-hole having a threaded portion with a first diameter and a second portion having a diameter smaller than the first diameter;
   coupling a threaded rod to the threaded portion of the through-hole of the core;
   inserting the insert into an installation hole of a first part, the first part being a manifold;
   pulling the core axially into the cylindrical sleeve wherein when the core is pulled axially into the cylindrical sleeve such that the outer wall slides axially within the cylindrical sleeve, the cylindrical sleeve expands against the hole in the manifold to secure the insert to the manifold; and
   removing the threaded rod from the threaded portion of the through-hole.

12. The method of claim 11, further comprising:
   providing a second part having a hole therein; and
   connecting the second part to the insert via the threaded portion of the through-hole of the core.

13. The method of claim 11, wherein the insert is positioned at a distance below an outer surface of the first part, the outer surface adjacent the installation hole, the distance long enough such that an intersecting passageway transverse the first hole is between the insert and the outer surface.

14. An insert for providing a calibrated metering orifice in a pressurized fluid manifold having a hole comprising:
   an insert having a cylindrical sleeve and a core, the core having a through-hole and a tapered outer wall which is smooth, the through-hole having a threaded portion with a first diameter and a second portion having a diameter smaller than the first diameter;
   the cylindrical sleeve configured to fit into the hole in the manifold wherein when the core is pulled axially into the cylindrical sleeve such that the tapered outer wall slides axially within the cylindrical sleeve, the cylindrical sleeve expands against the hole of the manifold to secure the insert to the manifold.

15. The insert of claim 14, wherein the second portion of the through-hole is provided without threads.

16. The insert of claim 14, wherein when the insert configured to be installed in the manifold, a top surface of the insert adjacent the threaded portion of the through-hole is below an outer surface of the manifold.

17. The insert of claim 14, wherein the insert is part of a system that includes the manifold and is installed in the manifold and a top surface of the insert adjacent the threaded portion of the through-hole is a distance below an outer surface of the manifold adjacent the hole, the distance long enough such that an intersecting passageway transverse the hole is between the insert and the outer surface; and wherein the core and sleeve are metallic.

* * * * *